(12) United States Patent
Lee et al.

(10) Patent No.: US 9,260,001 B2
(45) Date of Patent: Feb. 16, 2016

(54) POWER TRANSMISSION SYSTEM OF HYBRID ELECTRIC VEHICLE

(71) Applicant: Hyundai Motor Company, Seoul (KR)

(72) Inventors: Chang Wook Lee, Suwon-Si (KR); Jongsool Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 42 days.

(21) Appl. No.: 14/143,701

(22) Filed: Dec. 30, 2013

(65) Prior Publication Data

US 2015/0024894 A1    Jan. 22, 2015

(30) Foreign Application Priority Data

Jul. 17, 2013  (KR) .......................... 10-2013-0084389

(51) Int. Cl.
| | |
|---|---|
| *B60K 6/365* | (2007.10) |
| *F16H 3/72* | (2006.01) |
| *F16H 37/06* | (2006.01) |
| *B60K 6/42* | (2007.10) |
| *B60K 6/387* | (2007.10) |
| *B60K 6/445* | (2007.10) |
| *B60K 6/38* | (2007.10) |
| *F16H 37/10* | (2006.01) |

(52) U.S. Cl.
CPC . *B60K 6/42* (2013.01); *B60K 6/365* (2013.01); *B60K 6/387* (2013.01); *B60K 6/445* (2013.01); *F16H 3/728* (2013.01); *B60K 2006/381* (2013.01); *F16H 2037/102* (2013.01); *F16H 2200/0021* (2013.01); *Y10S 903/902* (2013.01)

(58) Field of Classification Search
CPC .................... F16H 2200/0021; B60K 3/365
See application file for complete search history.

(56) References Cited

U.S. PATENT DOCUMENTS

| | | | | |
|---|---|---|---|---|
| 8,556,758 | B1* | 10/2013 | Schoenek | B60K 6/40 180/65.6 |
| 2007/0265128 | A1* | 11/2007 | Conlon | B60K 6/365 475/5 |
| 2008/0242463 | A1* | 10/2008 | Yamada | B60K 6/365 475/5 |
| 2015/0018152 | A1* | 1/2015 | Kato | B60W 20/1084 475/5 |

FOREIGN PATENT DOCUMENTS

| | | |
|---|---|---|
| JP | 4007403 B1 | 3/2008 |
| KR | 10-2005-0008146 A | 1/2005 |
| KR | 10-1163822 B1 | 9/2010 |
| KR | 10-1144399 B1 | 1/2011 |

\* cited by examiner

*Primary Examiner* — Tisha Lewis
(74) *Attorney, Agent, or Firm* — Morgan, Lewis & Bockius LLP

(57) ABSTRACT

A power transmission system of a hybrid electric vehicle may include an input shaft, an output shaft, a first planetary gear set including a first rotation element directly connected to a first motor/generator, a second rotation element connected to the output shaft through an externally-meshed gear and a third rotation element directly connected to the input shaft, a second planetary gear set including a fourth rotation element directly connected to a second motor/generator, a fifth rotation element connected to the output shaft through an externally-meshed gear and a sixth rotation element selectively connected to a transmission housing and selectively connected to the first rotation element, transfer gears forming the externally-meshed gears, and frictional elements selectively connecting two rotation elements of the second planetary gear set, selectively connecting the first rotation element to the sixth rotation element, or selectively connecting the sixth rotation element to the transmission housing.

19 Claims, 10 Drawing Sheets

FIG. 2

| Mode | Shift-speed | Frictional element | | |
|---|---|---|---|---|
| | | CL1 | CL2 | BK1 |
| EV | 1ST | | | ● |
| | 2ND | ● | | |
| First and second hybrid operating modes | 1ST | | | ● |
| | 2ND | ● | | |
| Third hybrid operating mode | – | | ● | |
| Engine mode | 1ST | | ● | ● |
| | 2ND | ● | ● | |

POWER TRANSMISSION SYSTEM OF HYBRID ELECTRIC VEHICLE

CROSS-REFERENCE TO RELATED APPLICATION

The present application claims priority to Korean Patent Application No. 10-2013-0084389 filed on Jul. 17, 2013, the entire contents of which is incorporated herein for all purposes by this reference.

BACKGROUND OF THE INVENTION

1. Field of the Invention

The present invention relates to a power transmission system of a hybrid vehicle. More particularly, the present invention relates to a power transmission system of a hybrid vehicle which minimizes impact due to torque change of a motor/generator when being converted into a hybrid operating mode and reduces electric load and capacity of the motor/generator by giving more importance on mechanical power delivery path when splitting engine power.

2. Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Therefore, the vehicle makers have been developing future vehicles such as electric vehicles (EV), hybrid electric vehicles (HEV), and fuel cell electric vehicles (FCEV).

Since the future vehicles have technical restrictions such as weight and cost, the vehicle makers keep observation upon hybrid electric vehicles for meeting exhaust gas regulations and improving fuel consumption performance and are competing desperately to put the hybrid electric vehicles to practical use.

The hybrid electric vehicles are vehicles using more than two power source, and gasoline engines or diesel engines using fossil fuel and motor/generators driven by electrical energy are mainly used as the power source of the hybrid electric vehicles.

The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such a durability, power delivery efficiency, and size depend on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle having advantages of minimizing impact due to torque change of a motor/generator when being converted into a hybrid operating mode and reducing electric load and capacity of the motor/generator by giving more importance on mechanical power delivery path when splitting engine power.

In addition, various aspects of the present invention are directed to providing a power transmission system of a hybrid electric vehicle having further advantages of providing engine modes where a vehicle runs without consuming electric energy at the motor/generator for enhancement of fuel consumption when high-speed traveling.

A power transmission system of a hybrid electric vehicle according to an exemplary embodiment of the present invention may include an input shaft receiving torque of an engine, an output shaft disposed in parallel with the input shaft, a first planetary gear set including a first rotation element directly connected to a first motor/generator, a second rotation element connected to the output shaft through a first externally-meshed gear and a third rotation element directly connected to the input shaft, a second planetary gear set including a fourth rotation element directly connected to a second motor/generator, a fifth rotation element connected to the output shaft through a second externally-meshed gear and a sixth rotation element selectively connected to a transmission housing and selectively connected to the first rotation element, transfer gears forming the first and second externally-meshed gears, and frictional elements selectively connecting two rotation elements among three rotation element of the second planetary gear set, selectively connecting the first rotation element to the sixth rotation element, or selectively connecting the sixth rotation element to the transmission housing.

The first planetary gear set may be a single pinion planetary gear set, and may include a first sun gear being the first rotation element, a first planet carrier being the second rotation element, and a first ring gear being the third rotation element. In addition, the second planetary gear set may be a single pinion planetary gear set, and may include a second sun gear being the fourth rotation element, a second planet carrier being the fifth rotation element, and a second ring gear being the sixth rotation element.

The first planetary gear set may be a double pinion planetary gear set, and may include a first sun gear being the first rotation element, a first ring gear being the second rotation element, and a first planet carrier being the third rotation element. In addition, the second planetary gear set may be a single pinion planetary gear set, and may include a second sun gear being the fourth rotation element, a second planet carrier being the fifth rotation element, and a second ring gear being the sixth rotation element.

The first planetary gear set may be a single pinion planetary gear set, and may include a first sun gear being the first rotation element, a first planet carrier being the second rotation element, and a first ring gear being the third rotation element. In addition, the second planetary gear set may be a double pinion planetary gear set, and may include a second sun gear being the fourth rotation element, a second ring gear being the fifth rotation element, and a second planet carrier being the sixth rotation element.

The transfer gears may include a first transfer gear connecting the second rotation element to the output shaft, and a second transfer gear connecting the fifth rotation element to the output shaft.

The frictional elements may include a first clutch selectively connecting two rotation elements among three rotation elements of the second planetary gear set, a second clutch selectively connecting the first rotation element to the sixth rotation element, and a first brake selectively connecting the sixth rotation element to the transmission housing.

The first clutch may be disposed between the fourth rotation element and the sixth rotation element.

The first brake may be operated at a first EV mode, the first clutch may be operated at a second EV mode, the first brake may be operated at a first hybrid operating mode, the first clutch may be operated at a second hybrid operating mode, the second clutch may be operated at a third hybrid operating mode, the second clutch and the first brake may be operated at a first engine mode, and the first clutch and the second clutch may be operated at a second engine mode.

The first motor/generator and the second motor/generator may be disposed at the rear of the second planetary gear set.

A third clutch may be disposed between the engine and the input shaft.

A power transmission system of a hybrid electric vehicle according to another exemplary embodiment of the present invention may include an input shaft receiving torque of an engine, an output shaft disposed in parallel with the input shaft, a first planetary gear set including a first rotation element directly connected to a first motor/generator, a second rotation element connected to the output shaft and a third rotation element directly connected to the input shaft, a second planetary gear set including a fourth rotation element directly connected to a second motor/generator, a fifth rotation element connected to the output shaft and a sixth rotation element selectively connected to a transmission housing and selectively connected to the first rotation element, a first transfer gear connecting the second rotation element to the output shaft, a second transfer gear connecting the fifth rotation element to the output shaft, and frictional elements selectively connecting two rotation elements among three rotation element of the second planetary gear set, selectively connecting the first rotation element to the sixth rotation element, or selectively connecting the sixth rotation element to the transmission housing.

The first planetary gear set may be a single pinion planetary gear set, and may include a first sun gear being the first rotation element, a first planet carrier being the second rotation element, and a first ring gear being the third rotation element. In addition, the second planetary gear set may be a single pinion planetary gear set, and may include a second sun gear being the fourth rotation element, a second planet carrier being the fifth rotation element, and a second ring gear being the sixth rotation element.

The first planetary gear set may be a double pinion planetary gear set, and may include a first sun gear being the first rotation element, a first ring gear being the second rotation element, and a first planet carrier being the third rotation element. In addition, the second planetary gear set may be a single pinion planetary gear set, and may include a second sun gear being the fourth rotation element, a second planet carrier being the fifth rotation element, and a second ring gear being the sixth rotation element.

The first planetary gear set may be a single pinion planetary gear set, and may include a first sun gear being the first rotation element, a first planet carrier being the second rotation element, and a first ring gear being the third rotation element. In addition, the second planetary gear set may be a double pinion planetary gear set, and may include a second sun gear being the fourth rotation element, a second ring gear being the fifth rotation element, and a second planet carrier being the sixth rotation element.

The frictional elements may include a first clutch selectively connecting two rotation elements among three rotation elements of the second planetary gear set, a second clutch selectively connecting the first rotation element to the sixth rotation element, and a first brake selectively connecting the sixth rotation element to the transmission housing.

The first brake may be operated at a first EV mode, the first clutch may be operated at a second EV mode, the first brake may be operated at a first hybrid operating mode, the first clutch may be operated at a second hybrid operating mode, the second clutch may be operated at a third hybrid operating mode, the second clutch and the first brake may be operated at a first engine mode, and the first clutch and the second clutch may be operated at a second engine mode.

The first clutch may be disposed between the fourth rotation element and the sixth rotation element.

The first motor/generator and the second motor/generator may be disposed at the rear of the second planetary gear set.

A third clutch may be disposed between the engine and the input shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of frictional elements at each mode applied to a power transmission system according to the various exemplary embodiments of the present invention.

Figure 1:
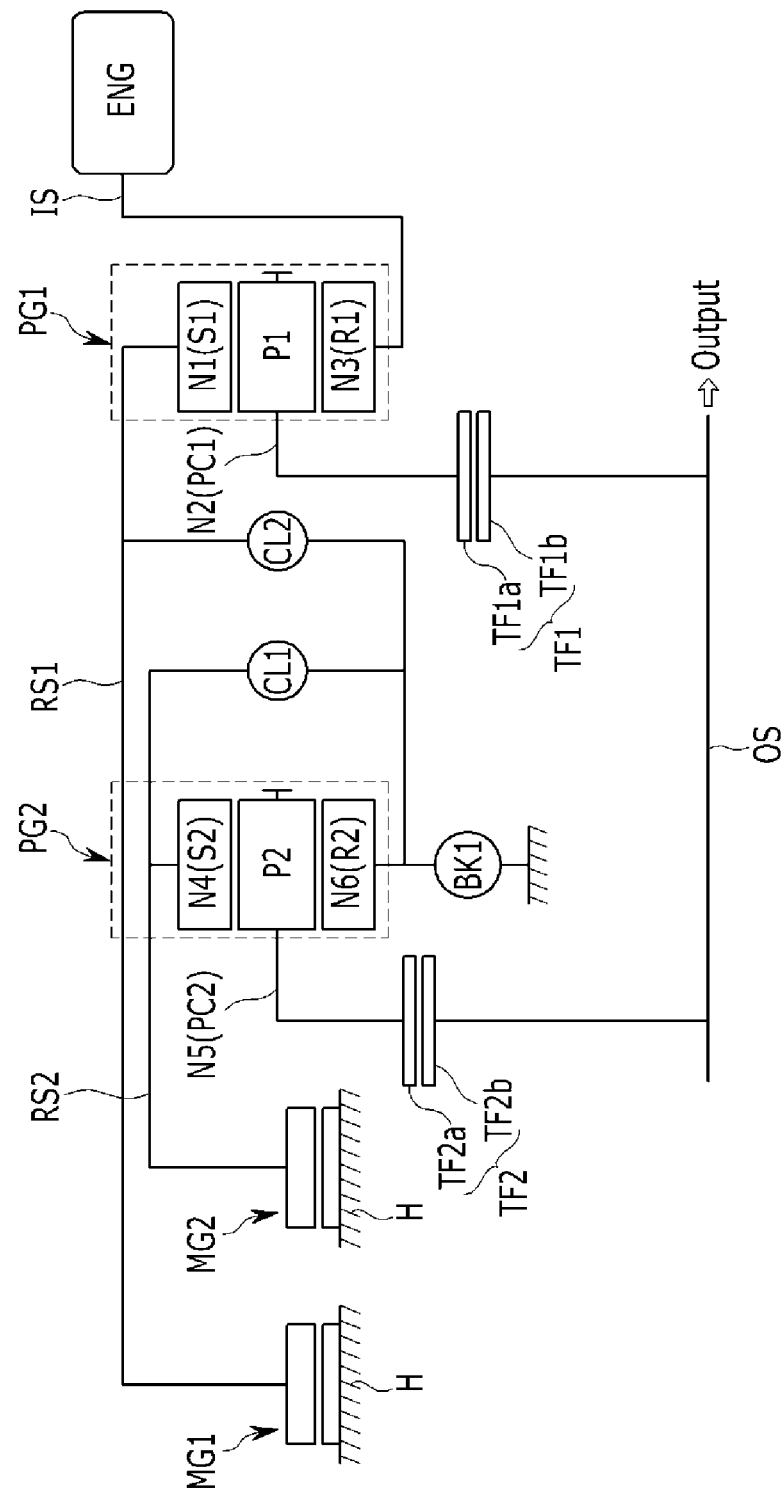
FIG. 1 is a schematic diagram of a power transmission system according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmission system according to the first exemplary embodiment of the present invention.

Referring to FIG. 1, a power transmission system of a hybrid electric vehicle according to the first exemplary embodiment of the present invention changes torque of an engine ENG transmitted through an input shaft IS according to running state of a vehicle, and outputs the changed torque through an output shaft OS.

The power transmission system includes first and second planetary gear sets PG1 and PG2, first and second motor/generators MG1 and MG2, and frictional elements including first and second clutches CL1 and CL2 and a first brake BK1.

One rotation element of the first planetary gear set PG1 and one rotation element of the second planetary gear set PG2 are connected through the output shaft OS, and another rotation element of the first planetary gear set PG1 and another rotation element of the second planetary gear set PG2 are connected to each other such that the first planetary gear set PG1 and the second planetary gear set PG2 are operated as one compound planetary gear set.

The first motor/generator MG1 and the second motor/generator MG2 are independent power sources and are operated as a motor and a generator.

The first motor/generator MG1 is directly connected to another rotation element of the first planetary gear set PG1 so as to be operated as a motor that supplies torque to another rotation element or as a generator that generates electricity by torque of another rotation element.

The second motor/generator MG2 is directly connected to the other rotation element of the second planetary gear set PG2 so as to be operated as a motor that supplies torque to the other rotation element or as a generator that generates electricity by torque of the other rotation element.

For this purpose, a stator of the first motor/generator MG1 and a stator of the second motor/generator MG2 are fixed to a transmission housing H, and a rotor of the first motor/generator MG1 and a rotor of the second motor/generator MG2 are connected respectively to another rotation element of the first planetary gear set PG1 and the other rotation element of the second planetary gear set PG2.

The first clutch CL1 is operated as a selective direct-coupling means. The first clutch CL1 connects two rotation elements among three rotation elements of the second planetary gear set PG2 so as to directly couple the second planetary gear set PG2.

The second clutch CL2 and the first brake BK1 are operated as selective connecting means. The second clutch CL2 selectively connects another rotation element of the first planetary gear set PG1 to another rotation element of the second planetary gear set PG2, and the first brake BK1 selectively connects another rotation element of the second planetary gear set PG2 to the transmission housing H.

The first and second clutches CL1 and CL2 are frictional elements selectively connecting a rotation element with another rotation element, and the first brake BK1 is a frictional element selectively connecting a rotation element with a fixed element (i.e., transmission housing). The first and second clutches CL1 and CL2 and the brake BK may be conventional multi-plate friction elements of wet type that are operated by hydraulic pressure.

The power transmission system of a hybrid electric vehicle according to the first exemplary embodiment of the present invention will be described in further detail.

The first planetary gear set PG1 is a single pinion planetary gear set, and includes the first rotation element N1 being a first sun gear S1, the second rotation element N2 being a first planet carrier PC1 rotatably supporting a first pinion P1 externally meshed with the first sun gear S1, and the third rotation element N3 being a first ring gear R1 internally meshed with the first pinion P1.

The second planetary gear set PG2 is a single pinion planetary gear set, and includes the fourth rotation element N4 being a second sun gear S2, the fifth rotation element N5 being a second planet carrier PC2 rotatably supporting a second pinion P2 externally meshed with the second sun gear S2, and the sixth rotation element N6 being a second ring gear R2 internally meshed with the second pinion P2.

The first planet carrier PC1 of the second rotation element N2 and the second planet carrier PC2 of the fifth rotation element N5 are connected through the output shaft OS, the first sun gear S1 of the first rotation element N1 and the second ring gear R2 of the sixth rotation element N6 are selectively connected, and the first ring gear R1 of the third rotation element N3 is directly connected to the input shaft IS.

First and second transfer gears TF1 and TF2 are disposed between the second rotation element N2 and the output shaft OS and between the fifth rotation element N5 and the output shaft OS, respectively.

The first and second transfer gears TF1 and TF2 respectively have first and second transfer drive gears TF1a and TF2a and first and second transfer driven gear TF1b and TF2b externally meshed with each other.

The first transfer drive gear TF1a is connected to the second rotation element N2, the second transfer drive gear TF2a is connected to the fifth rotation element N5, and the first and second transfer driven gears TF1b and TF2b externally meshed with the first and second transfer drive gears TF1a and TF2a are fixedly disposed on the output shaft OS.

In addition, gear ratios of the first and second transfer gears TF1 and TF2 can be set according to target speed ratios.

In addition, any one of the first and second transfer driven gears TF1b and TF2b is a final output gear. The final output gear transmits driving torque to a driving wheel through a differential apparatus. It is exemplified in the first exemplary embodiment of the present invention that the first transfer driven gear TF1b is operated as the final output gear.

The first motor/generator MG1 is connected to the first sun gear S1 of the first rotation element N1 through a first rotation shaft RS1 so as to be operated as the motor driving the first sun gear S1 or as the generator generating electricity by torque of the first sun gear S1.

The second motor/generator MG2 is connected to the second sun gear S2 of the fourth rotation element N4 through a second rotation shaft RS2 disposed at the radially exterior of the first rotation shaft RS1 without rotational interference therebetween so as to be operated as the motor driving the second sun gear S2 or as the generator generating electricity by torque of the second sun gear S2.

The second motor/generator MG2 is disposed at the rear of the second planetary gear set PG2, and the first motor/generator MG1 is disposed at the rear of the second motor/generator PG2.

The first clutch CL1 is disposed between the second sun gear S2 of the fourth rotation element N4 and the second ring gear R2 of the sixth rotation element N6 and directly couples the second planetary gear set PG2.

The second clutch CL2 is disposed between the first sun gear S1 of the first rotation element N1 and the second ring gear R2 of the sixth rotation element N6 and selectively connects the first sun gear S1 to the second ring gear R2.

The first brake BK1 is disposed between the second ring gear R2 of the sixth rotation element N6 and the transmission housing H and selectively connects the second ring gear R2 to the transmission housing H.

The first and second clutches CL1 and CL2 are disposed between the first planetary gear set PG1 and the second planetary gear set PG2, and the first brake BK1 is disposed at the radially exterior of the second planetary gear set PG2.

FIG. 2 is an operational chart of frictional elements at each mode applied to a power transmission system according to the first exemplary embodiment of the present invention.

Referring to FIG. 2, a first EV (Electric Vehicle) mode is achieved by operating the first brake BK1.

A second EV mode is achieved by operating the first clutch CL1.

A first hybrid operating mode is achieved by operating the first brake BK1.

A second hybrid operating mode is achieved by operating the first clutch CL1.

A third hybrid operating mode is achieved by operating the second clutch CL2.

A first engine mode is achieved by operating the second clutch CL2 and the first brake BK1.

A second engine mode is achieved by operating the first clutch CL1 and the second clutch CL2.

As described above, the power transmission system according to the first exemplary embodiment of the present invention can realize two EV modes, three hybrid operating modes, and two engine modes.

Figure 3:
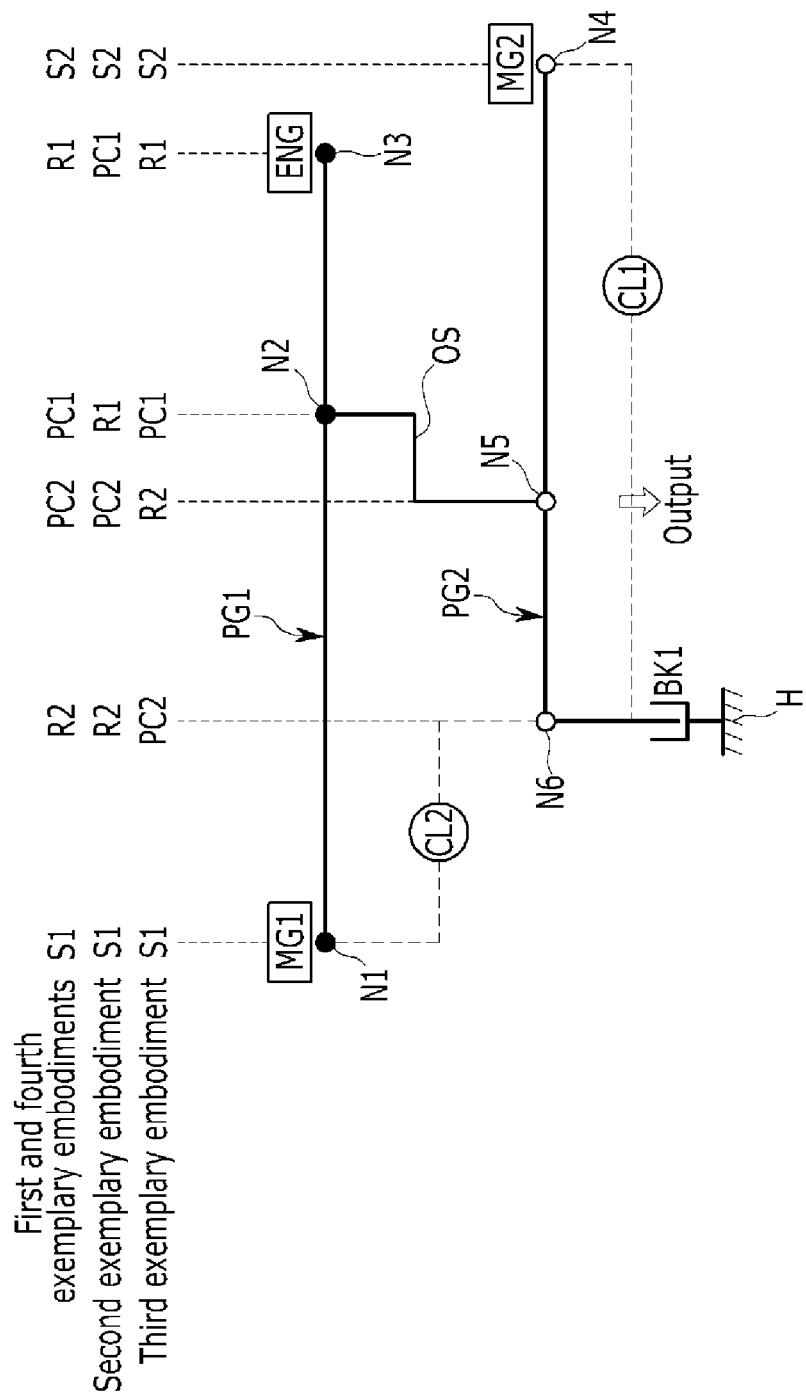
FIG. 3 is a schematic diagram briefly illustrating connection of rotation elements in a power transmission system according to the various exemplary embodiments of the present invention.
Figure 4:
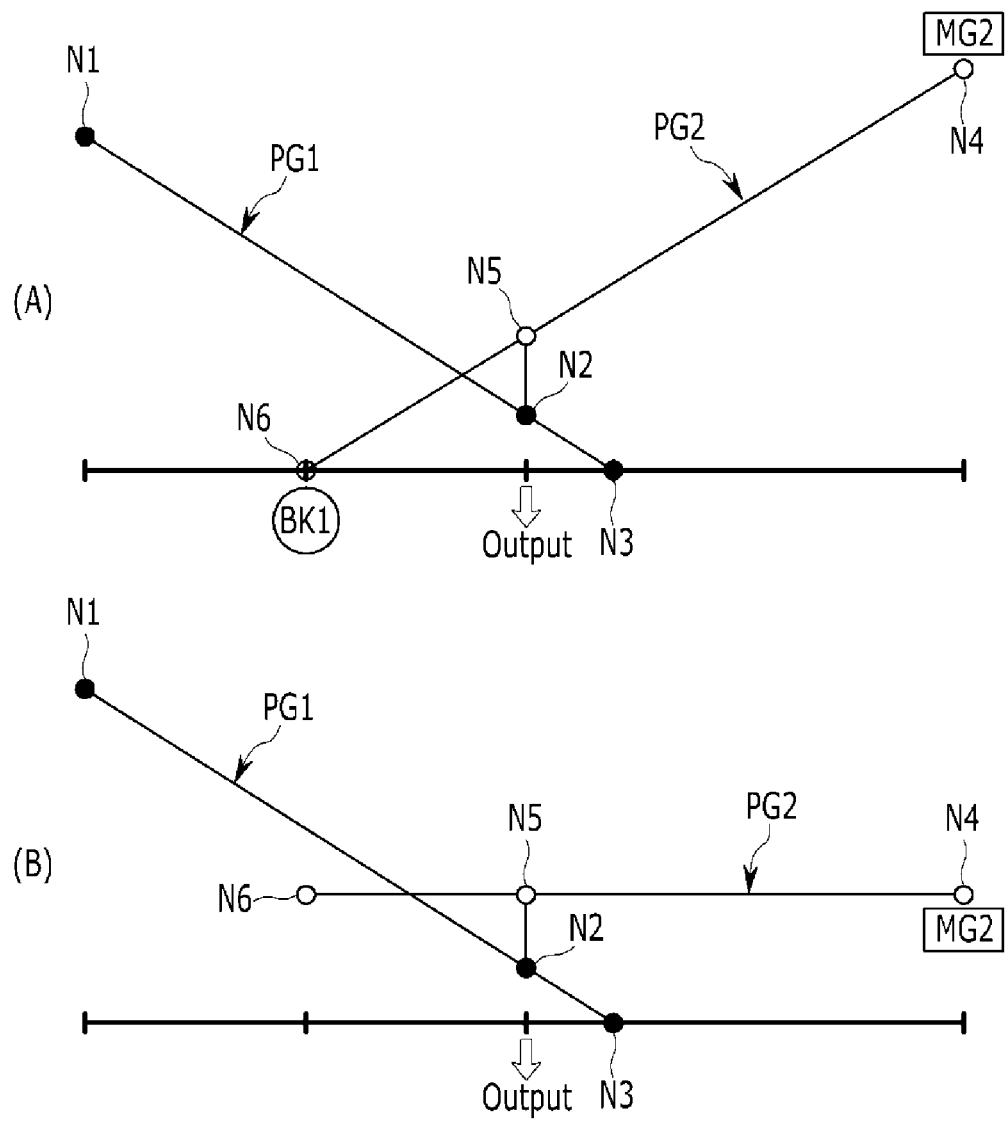
FIG. 4A is a drawing for explaining operation of the power transmission system according to the various exemplary embodiments of the present invention at the first EV mode.
FIG. 4B is a drawing for explaining operation of the power transmission system according to the various exemplary embodiments of the present invention at the second EV mode.
Figure 5:
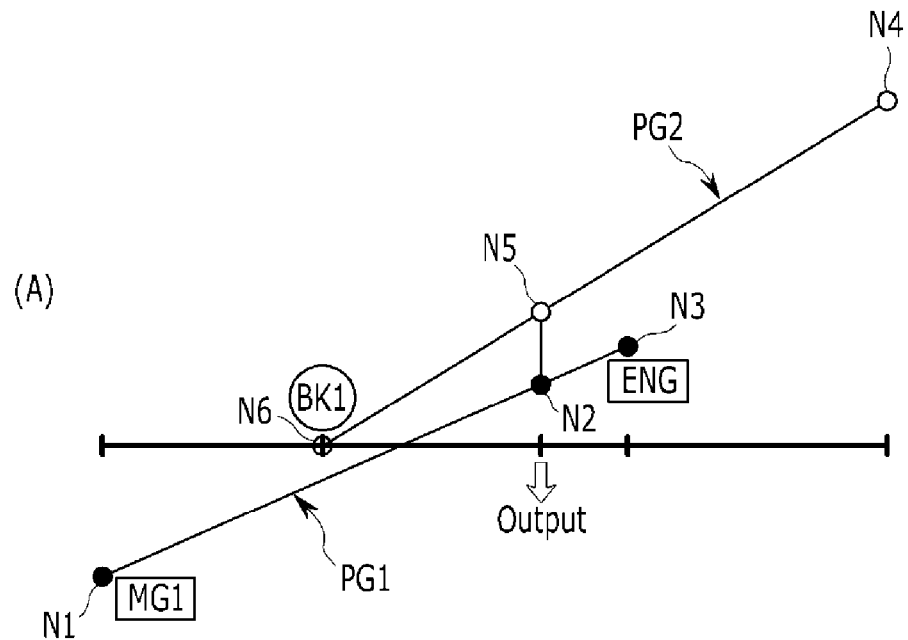
FIG. 5A is a drawing for explaining operation of the power transmission system according to the various exemplary embodiments of the present invention at the first hybrid operating mode.
FIG. 5B is a drawing for explaining operation of the power transmission system according to the various exemplary embodiments of the present invention at the second hybrid operating mode.
Figure 5:
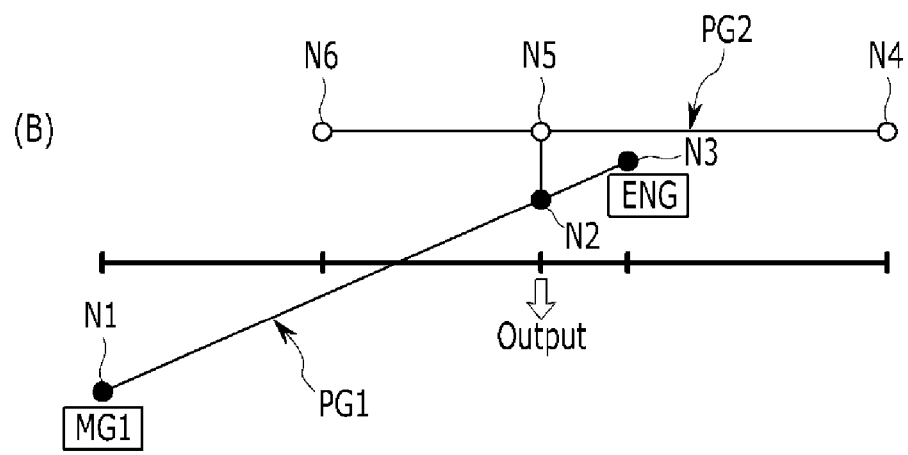

FIG. 3 is a schematic diagram briefly illustrating connection of rotation elements in a power transmission system according to the first exemplary embodiment of the present invention.

Referring to FIG. 3, the second rotation element N2 and the fifth rotation element N5 are connected through the output shaft OS, and the first rotation element N1 and the sixth rotation element N6 are selectively connected through the second clutch CL2 in the power transmission system according to the first exemplary embodiment of the present invention.

In addition, the first rotation element N1 is connected to the first motor/generator MG1, the third rotation element N3 is connected to the engine ENG, and the fourth rotation element N4 is connected to the second motor/generator MG2.

In addition, the sixth rotation element N6 is selectively connected to the transmission housing H through the first brake BK1, and the fourth rotation element N4 and the sixth rotation element N6 are selectively connected through the first clutch CL1.

FIG. 4 to FIG. 7 are drawings for explaining operation of a power transmission system according to the first exemplary embodiment of the present invention at each mode. FIG. 4 to FIG. 7 illustrate change of input rotation speed assuming that output rotation speed is constant.

[First EV Mode]

FIG. 4A is a drawing for explaining operation of the power transmission system according to the first exemplary embodiment of the present invention at the first EV mode.

The EV mode is a mode where power of a battery is supplied to a motor/generator in a stopped state of an engine such that a vehicle is driven by power of the motor/generator.

Since the engine is stopped, fuel economy may be enhanced, and the vehicle can move rearward without an additional reverse speed device at the EV mode. The EV mode is utilized when the vehicle is started in a stopped state or the vehicle runs with a low speed. A reduced gear ratio where the power source rotates faster than an output member is required for assisting hill-start or quick acceleration.

Under such conditions, the sixth rotation element N6 is operated as a fixed element by operation of the first brake BK1, and the second motor/generator MG2 is operated so as to input torque of the second motor/generator MG2 to the fourth rotation element N4 at the first EV mode. Therefore, the torque of the second motor/generator MG2 is changed according to the gear ratio of the second planetary gear set PG2 and the changed torque is output.

At this time, the first planetary gear set PG1 is not involved in a shift. However, the third rotation element N3 is stopped together with the engine and the second rotation element N2 is connected to the fifth rotation element N5 through the output shaft OS. Therefore, the first and second rotation elements N1 and N2 are idling.

[Second EV Mode]

FIG. 4B is a drawing for explaining operation of the power transmission system according to the first exemplary embodiment of the present invention at the second EV mode.

Efficiency of the motor/generator changes according to rotation speed and torque thereof. This means that a conversion ratio of electrical energy into mechanical energy is different according to the rotation speed and the torque of the motor/generator even though the same amount of current is supplied.

Current of the battery used at EV mode is generated by burning fuel in the engine or being accumulated by regenerative braking, but how to use the accumulated energy efficiently affects on enhancement of fuel economy directly.

For this reason, a transmission realizing more than two shift-speeds is increasingly mounted on the electric vehicle, and it is advantageous that the hybrid vehicle realizes the EV mode having more than two shift-speeds. Therefore, the exemplary embodiment of the present invention can realize two EV modes.

Shifting processes to the second EV mode are as follows. If vehicle speed increases during the vehicle drives at the first EV mode, efficiency of the second motor/generator MG2 is deteriorated. At this time, if the first brake BK1 is released and the first clutch CL1 is operated at a point where the efficiency of the second motor/generator MG2 is bad, the second EV mode is achieved.

In this case, since the first clutch CL1 that is the direct-coupling device of the second planetary gear set PG2 is operated, the second planetary gear set PG2 becomes a direct-coupling state. Therefore, all the rotation elements N4, N5, and N6 of the second planetary gear set PG2 rotate with the same speed and the driving torque is output through the fifth rotation element N5.

At this time, the first planetary gear set PG1 is not involved in a shift. However, the third rotation element N3 is stopped together with the engine, and the first and second rotation elements N1 and N2 are idling.

[First Hybrid Operating Mode]

FIG. 5A is a drawing for explaining operation of the power transmission system according to the first exemplary embodiment of the present invention at the first hybrid operating mode.

The torque of the engine is delivered to the output member through mechanical path and electrical path at the first hybrid operating mode, and such split of the engine torque is done by the planetary gear set. Since the engine and the motor/generator connected to the planetary gear set can control their rotation speeds regardless of the vehicle speed, the power transmission system at the first hybrid operating mode is operated as an electric continuously variable transmission.

The speed and the torque of the engine are fixed at given vehicle speed in a conventional transmission, but the speed and the torque of the engine can be changed freely at the given vehicle speed in the electric continuously variable transmission. Therefore, driving efficiency of the engine may be maximized and fuel economy may be enhanced.

Shifting processes to the first hybrid operating mode are as follows. The second rotation element N2 and the fifth rotation element N5 are connected to the output shaft OS respectively through the first and second transfer gears TF1 and TF2, but the first and third rotation elements N1 and N3 can rotate freely at the first EV mode (referring to FIG. 4A).

If the engine ENG is started using the first motor generator MG1 at this state, speeds of the engine ENG and the first motor/generator MG1 can be controlled regardless of the vehicle speed.

Therefore, if the engine ENG and the first motor/generator MG1 are controlled, the torque of the engine and the torque of the first motor/generator MG1 are summed up and the summed torque is delivered to the output shaft OS. Therefore, high driving torque may be generated.

At this time, as shown in FIG. 5A, the first motor/generator MG1 is operated as the generator if rotating negatively, and the first motor/generator MG1 is operated as the motor if rotating positively (at this time, the rotation speed of the engine ENG decreases).

In addition, the sixth rotation element N6 is operated as the fixed element by operation of the first brake BK1, the driving torque is output through the fifth rotation element N5, and the fourth rotation element N4 is idling in the second planetary gear set PG2.

Since the engine ENG and the first motor/generator MG1 can be controlled independently at the first hybrid operating mode, fuel economy and driving performance may be greatly enhanced.

[Second Hybrid Operating Mode]

FIG. 5B is a drawing for explaining operation of the power transmission system according to the first exemplary embodiment of the present invention at the second hybrid operating mode.

If the vehicle speed increased during the vehicle runs at the first hybrid operating mode, the first brake BK1 is released and the first clutch CL1 is operated so as to lower rotation speeds of all the rotation elements of the first planetary gear set PG1. Accordingly, the second hybrid operating mode begins.

Since the first clutch CL1 that is the direct-coupling device of the second planetary gear set PG2 is operated, the second planetary gear set PG2 becomes a direct-coupling state. Therefore, all the rotation elements N4, N5, and N6 of the second planetary gear set PG2 rotate with the same speed.

At this time, the second rotation element N2 and the fifth rotation element N5 are connected to the output shaft OS through the first and second transfer gears TF1 and TF2, but the first and third rotation elements N1 and N3 can rotate freely.

Therefore, the engine ENG and the first motor/generator MG1 can be independently controlled regardless of the vehicle speed.

Since the engine ENG and the first motor/generator MG1 can be controlled independently at the second hybrid operating mode, the same as at the first hybrid operating mode, fuel economy and driving performance may be greatly enhanced.

[Third Hybrid Operating Mode]

Figure 6:
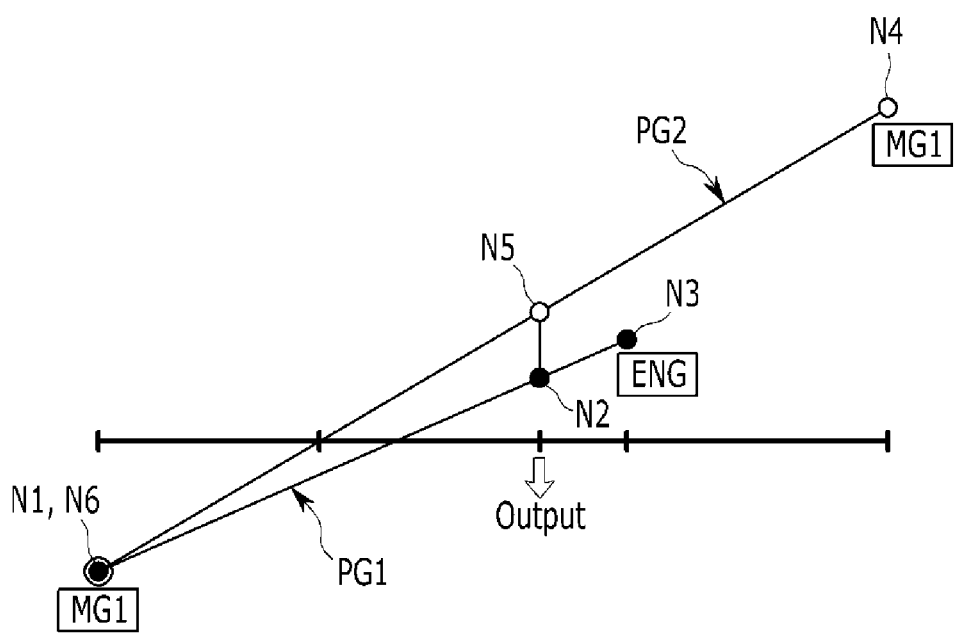
FIG. 6 is a drawing for explaining operation of the power transmission system according to the various exemplary embodiments of the present invention at the third hybrid operating mode.
Figure 7:
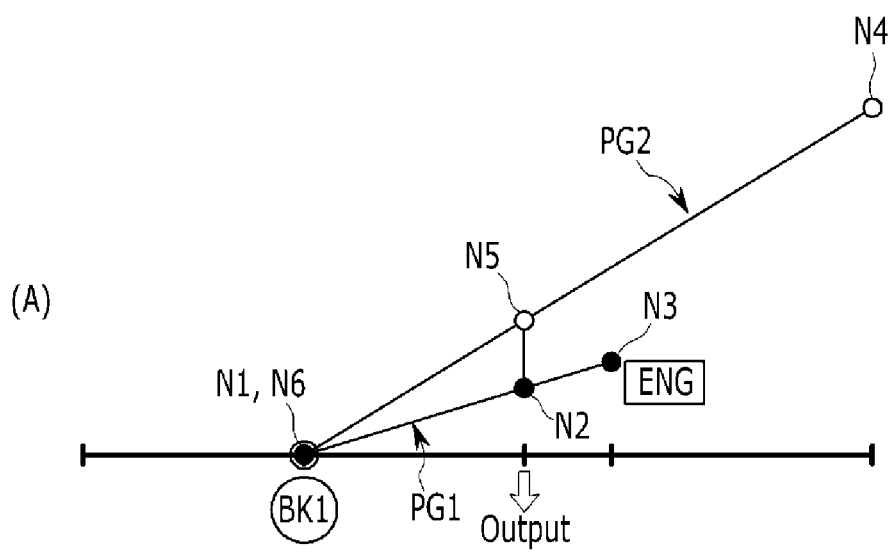
FIG. 7A is a drawing for explaining operation of the power transmission system according to the various exemplary embodiments of the present invention at the first engine mode.
FIG. 7B is a drawing for explaining operation of the power transmission system according to the various exemplary embodiments of the present invention at the second engine mode.
Figure 7:
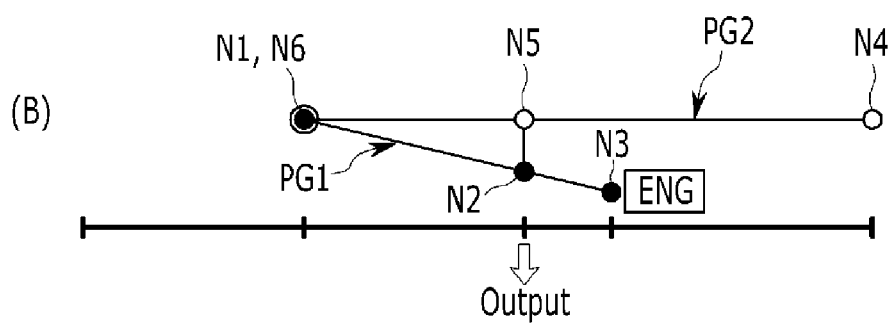

FIG. 6 is a drawing for explaining operation of the power transmission system according to the first exemplary embodiment of the present invention at the third hybrid operating mode.

Since the rotation speed of the motor/generator connected to the output element is restricted to the vehicle speed, the motor/generator cannot be operated efficiently and capacity of the motor/generator is hard to be reduced at the first and second hybrid operating modes.

Particularly, if the rotation speed of the motor/generator restricted to the vehicle speed is high due to high vehicle speed, efficiency of the motor/generator may be deteriorated and fuel economy may be hard to be optimized.

Under such conditions, two rotation elements of the first planetary gear set PG1 connected to the engine ENG and two rotation elements of the second planetary gear set PG2 are connected to each other so that the rotation speed of the engine ENG and the rotation speeds of two motor/generators MG1 and MG2 are controlled regardless the vehicle speed. Thereby, the power transmission system may be operated as a continuously variable transmission and may enhance fuel economy.

If the second clutch CL2 is operated, the first rotation element N1 and the sixth rotation element N6 are connected and rotated with the same speed. In addition, since the second rotation element N2 and the fifth rotation element N5 are directly connected, rotation elements of the first planetary gear set PG1 and the second planetary gear set PG2 are restricted by each other.

That is, rotation speeds and torques of the rotation elements are restricted by each other.

In addition, since electrical energy of the first and second motor/generators MG1 and MG2 should be balanced, the speeds and the torques of all the rotation elements of the first and second planetary gear sets PG1 and PG2 are correlated to each other and the power transmission system operates as the electric continuously variable transmission at the third hybrid operating mode.

The first hybrid operating mode and the second hybrid operating mode can be converted into the third hybrid operating mode. That is, if the first hybrid operating mode and the second hybrid operating mode are converted into the third hybrid operating mode, the second clutch CL2 is operated. After that, the engine ENG and the second motor/generator MG2 that can be independently controlled at the first and second hybrid operating modes are synchronized and the first brake BK1 or the first clutch CL1 is released. Therefore, conversion to the third hybrid operating mode can be done smoothly.

That is, when the first hybrid operating mode is converted into the third hybrid operating mode, the engine ENG and the second motor/generator MG2 are synchronized by operating the second clutch CL2 and the first brake BK1 is released. When the second hybrid operating mode is converted into the third hybrid operating mode, the engine ENG and the second motor/generator MG2 are synchronized by operating the second clutch CL2 and the first clutch CL1 is released.

When converting from the first hybrid operating mode or the second hybrid operating mode to the third hybrid operating mode, direction of torque of the first and second motor/generators MG1 and MG2 does not change. Therefore, impact due to mode conversion does not occur.

[First Engine Mode]

FIG. 7A is a drawing for explaining operation of the power transmission system according to the first exemplary embodiment of the present invention at the first engine mode.

Important technique in the hybrid vehicle for enhancing fuel economy is recovery and reuse of brake energy and control of driving point of the engine.

In addition, controlling of the driving point of the engine accompanies conversion of mechanical energy of the engine into electric energy of the motor/generator and conversion of the electric energy of the motor/generator back into mechanical energy at the motor/generator.

During energy conversion, all input energy is not output and energy loss occurs. Since fuel economy at the engine mode where the vehicle is driven only by the engine may be superior to that at the hybrid mode at any driving condition, the exemplary embodiments of the present invention provide two engine modes.

That is, the second clutch CL2 and the first brake BK1 are operated at the first engine mode. In this case, the first and sixth rotation elements N1 and N6 are operated as the fixed elements and the third rotation element N3 is rotated with the same speed as the engine. Therefore, reduced speed ratio is generated.

At this time, since the first and second motor/generators MG1 and MG2 do not need to provide torque, the first engine mode at which the vehicle is driven only by the engine ENG is achieved.

[Second Engine Mode]

FIG. 7B is a drawing for explaining operation of the power transmission system according to the first exemplary embodiment of the present invention at the second engine mode.

If the vehicle speed increases during the vehicle runs at the first engine mode, the first brake BK1 is released and the first clutch CL1 is operated.

In this case, all the rotation elements of the second planetary gear set PG2 rotate with the same speed by operation of the first and second clutches CL1 and CL2, and the torque of the engine ENG is input to the third and fourth rotation elements N3 and N4. In addition, the third rotation element N3 is rotated with the same speed as the engine ENG.

Since the second rotation element N2 and the fifth rotation element N5 are connected to the output shaft OS respectively through the first and second transfer gears TF1 and TF2, the second rotation element N2 and the fifth rotation element N5 are rotated with a constant gear ratio.

Since the first and second motor/generators MG1 and MG2 need not to provide torque at this time, the second engine mode at which the vehicle is driven only by the torque of the engine ENG is achieved.

According to the first exemplary embodiment of the present invention, two EV modes, three hybrid operating modes, and two engine modes can be achieved by combining two planetary gear sets PG1 and PG2, three frictional elements CL1, CL2, and BK1, and two motor/generators MG1 and MG2.

In addition, the electric load may be reduced and the maximum power of the engine may be used by giving more importance on mechanical power delivery path when splitting the engine power. Further, the number of mode conversions may be decreased when starting, and change in rotation speed of all the rotation elements may be minimized when converting modes.

Since sufficient power performance is provided in WOT (Wide Open Throttle) start, conversion to the engine mode is suppressed and maximum power of the engine can be used in conversion among the first, second, and third hybrid operating modes.

In addition, the second clutch CL2 is disposed between the first rotation element N1 of the first planetary gear set PG1 and the sixth rotation element N6 of the second planetary gear set PG2 so as to freely perform a mode changed from the first hybrid operating mode or the second hybrid operating mode into the third hybrid operating mode according to the first exemplary embodiment of the present invention. If the second clutch CL2 is operated, the engine ENG and the second motor/generator MG2 that can be independently controlled at the first and second hybrid operating modes are synchronized and conversion to the third hybrid operating mode is then achieved. Therefore, mode conversion can be achieved smoothly.

Therefore, impact due to engagement of the second clutch CL2 may be suppressed and direction of torque of the first motor/generator MG1 and the second motor/generator MG2 is maintained before or after mode conversion. Therefore, controllability may be excellent.

After mode conversion is achieved, the engine is operated at its maximum power point at the third hybrid operating mode, and the rotation speed of the second motor/generator MG2 decreases as the vehicle speed increases. Therefore, the vehicle can be driven within a drive limit range of the motor.

Since the engine mode is provided, the vehicle can run with high speed without electric load of the first and second motor/generators MG1 and MG2. Therefore, fuel economy may be improved.

Figure 8:
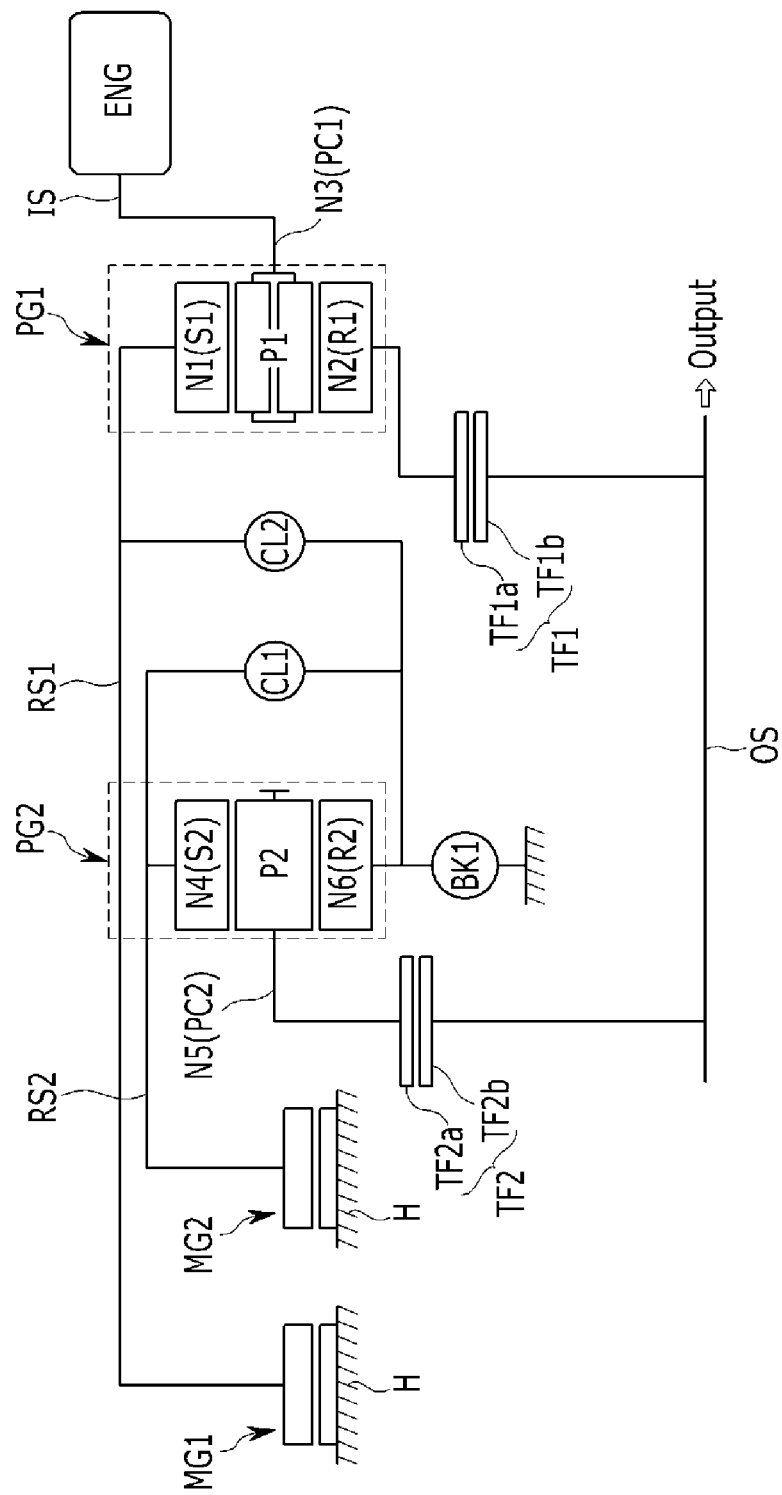
FIG. 8 is a schematic diagram of a power transmission system according to the various exemplary embodiments of the present invention.

FIG. 8 is a schematic diagram of a power transmission system according to the second exemplary embodiment of the present invention.

Referring to FIG. 8, the first planetary gear set PG1 is the single pinion planetary gear set in the first exemplary embodiment, but the first planetary gear set PG1 is a double pinion planetary gear set in the second exemplary embodiment.

Therefore, the first sun gear S1 is the first rotation element N1, the first ring gear R1 is the second rotation element N2, and the first planet carrier PC1 is the third rotation element N3.

Since functions of the second exemplary embodiment are the same as those of the first exemplary embodiment except the rotation elements including the second and third rotation elements N2 and N3, detailed description thereof will be omitted.

Figure 9:
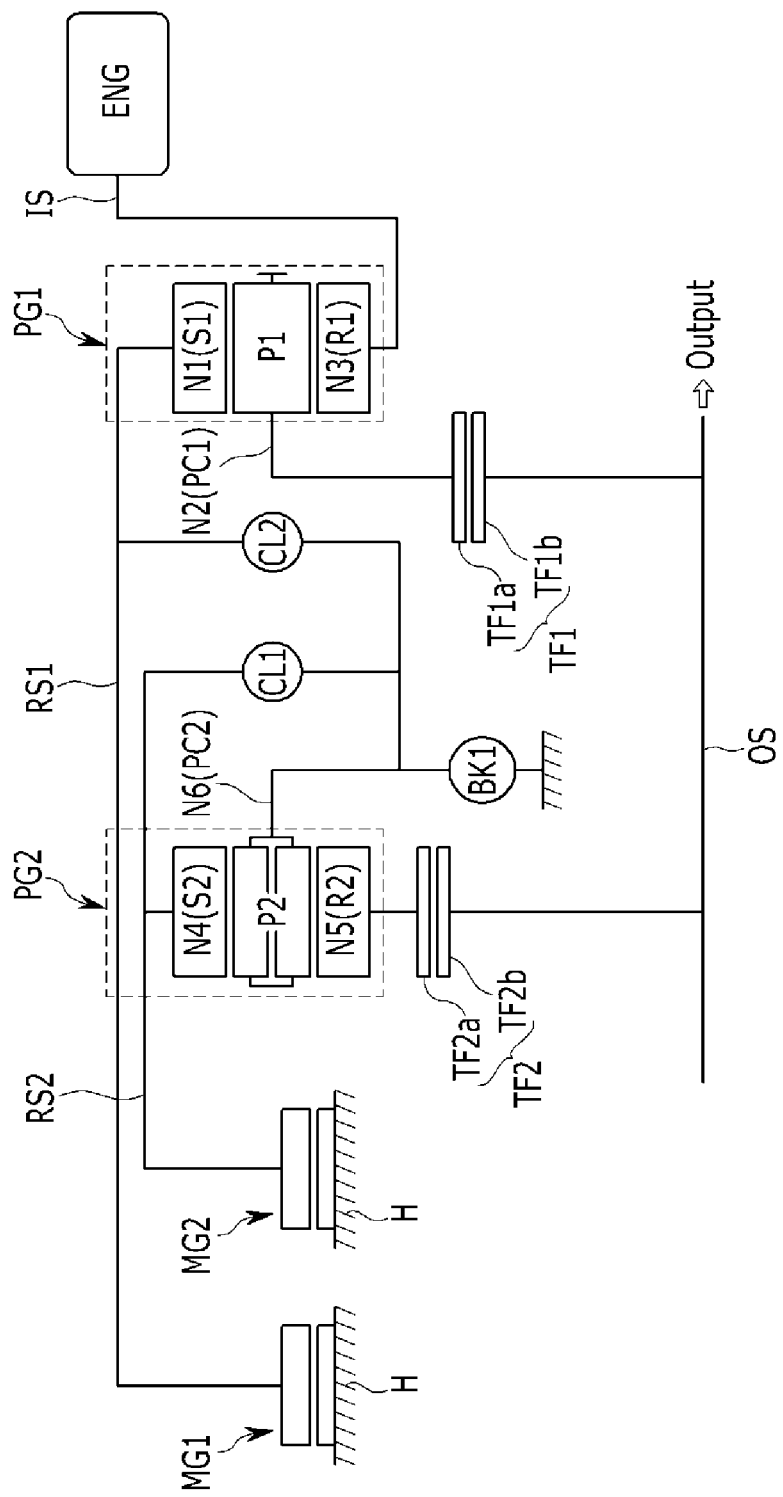
FIG. 9 is a schematic diagram of a power transmission system according to the various exemplary embodiments of the present invention.

FIG. 9 is a schematic diagram of a power transmission system according to the third exemplary embodiment of the present invention.

Referring to FIG. 9, the second planetary gear set PG2 is the single pinion planetary gear set in the first exemplary embodiment, but the second planetary gear set PG2 is a double pinion planetary gear set in the third exemplary embodiment.

Therefore, the second sun gear S2 is the fourth rotation element N4, the second ring gear R2 is the fifth rotation element N2, and the second planet carrier PC2 is the sixth rotation element N6.

Since functions of the second exemplary embodiment are the same as those of the first exemplary embodiment except the rotation elements including the fifth and sixth rotation elements N5 and N6, detailed description thereof will be omitted.

Figure 10:
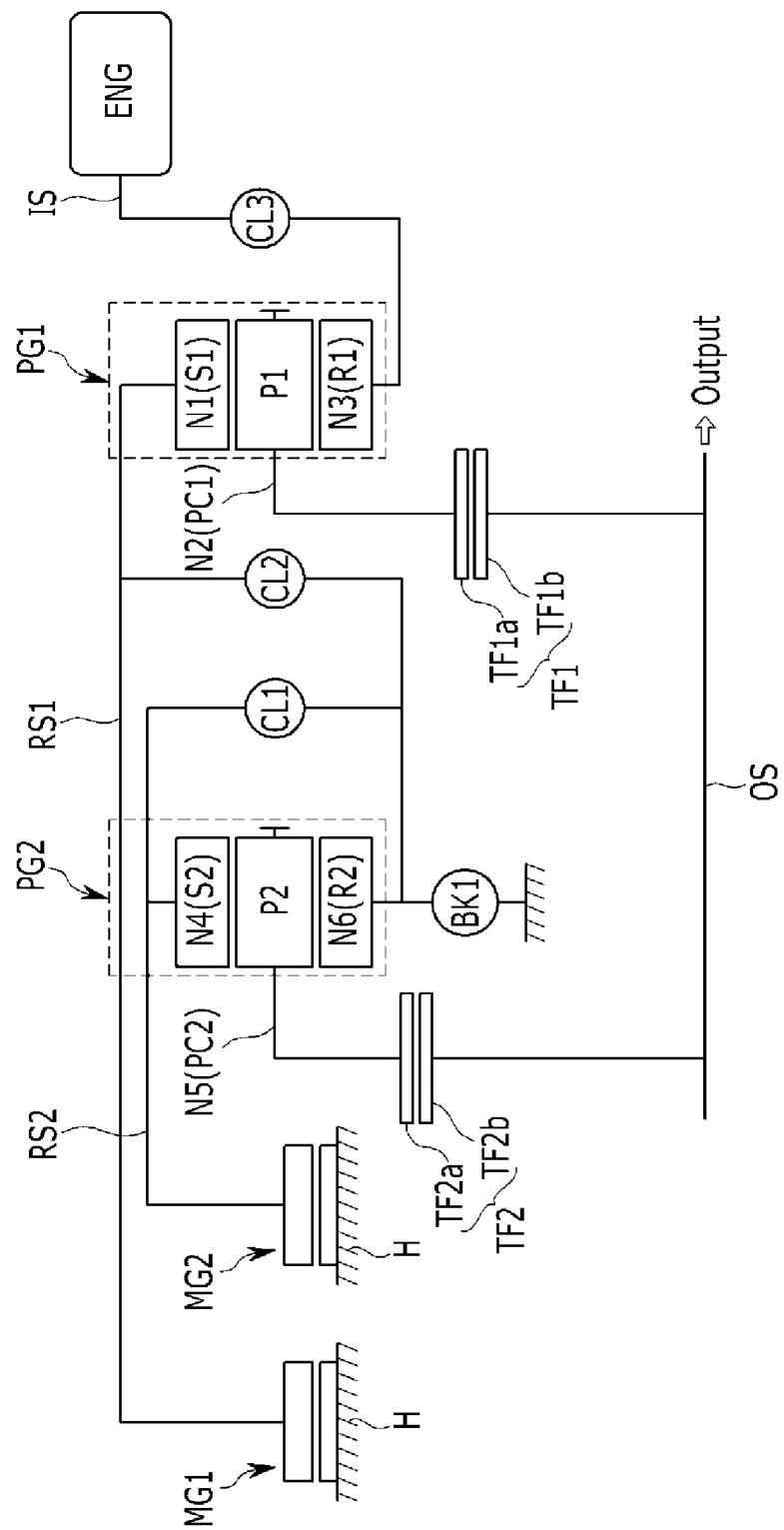
FIG. 10 is a schematic diagram of a power transmission system according to the various exemplary embodiments of the present invention.

FIG. 10 is a schematic diagram of a power transmission system according to the fourth exemplary embodiment of the present invention.

Referring to FIG. 10, a clutch that is selective power delivery means is not disposed between the engine ENG and the third rotation element N3 in the first exemplary embodiment, but a third clutch CL3 that is selective power delivery means is disposed between the engine ENG and the third rotation element N3 in the fourth exemplary embodiment.

Therefore, the third clutch CL3 is operated at a mode where the torque of the engine ENG is demanded, the torque of the engine ENG is transmitted to the third rotation element N3 of the first planetary gear set PG1.

Since functions of the fourth exemplary embodiment are the same as those of the first exemplary embodiment except whether the third clutch CL3 exists or not, detailed description thereof will be omitted.

The electric load may be reduced and the maximum power of the engine may be used by giving more importance on mechanical power delivery path when splitting the engine power. Further, the number of mode conversions may be decreased when starting, and change in rotation speed of all the rotation elements may be minimized when converting modes.

Since sufficient power performance is provided in WOT (Wide Open Throttle) start, conversion to the engine mode is suppressed and maximum power of the engine can be used in conversion between the hybrid input split mode and the compound split mode.

In addition, the second clutch is disposed between the first rotation element of the first planetary gear set and the sixth rotation element of the second planetary gear set so as to freely perform a mode changed from the first hybrid operating mode or the second hybrid operating mode into the third hybrid operating mode according to the exemplary embodiments of the present invention. If the second clutch is operated, the engine and the second motor/generator that can be independently controlled at the first and second hybrid operating modes are synchronized and conversion to the third hybrid operating mode is then achieved. Therefore, mode conversion can be achieved smoothly.

Therefore, impact due to engagement of the second clutch may be suppressed and direction of torque of the first motor/generator and the second motor/generator is maintained before or after mode conversion. Therefore, controllability may be excellent.

After mode conversion is achieved, the engine is operated at its maximum power point at the third hybrid operating mode, and the rotation speed of the second motor/generator decreases as the vehicle speed increases. Therefore, the vehicle can be driven within a drive limit range of the motor.

Since the engine mode is provided, the vehicle can run with high speed without electric load of the first and second motor/generators. Therefore, fuel economy may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmission system of a hybrid electric vehicle comprising:
an input shaft receiving torque of an engine;
an output shaft disposed in parallel with the input shaft;

a first planetary gear set including:
  a first rotation element directly connected to a first motor/generator;
  a second rotation element connected to the output shaft through a first externally-meshed gear; and
  a third rotation element directly connected to the input shaft;
a second planetary gear set including:
  a fourth rotation element directly connected to a second motor/generator;
  a fifth rotation element connected to the output shaft through a second externally-meshed gear; and
  a sixth rotation element selectively connected to a transmission housing and selectively connected to the first rotation element;
transfer gears forming the first and second externally-meshed gears; and
frictional elements selectively connecting two rotation elements among three rotation element of the second planetary gear set, selectively connecting the first rotation element to the sixth rotation element, or selectively connecting the sixth rotation element to the transmission housing.

2. The power transmission system of claim 1,
wherein the first planetary gear set is a single pinion planetary gear set, and includes a first sun gear being the first rotation element, a first planet carrier being the second rotation element, and a first ring gear being the third rotation element, and
wherein the second planetary gear set is a single pinion planetary gear set, and includes a second sun gear being the fourth rotation element, a second planet carrier being the fifth rotation element, and a second ring gear being the sixth rotation element.

3. The power transmission system of claim 1,
wherein the first planetary gear set is a double pinion planetary gear set, and includes a first sun gear being the first rotation element, a first ring gear being the second rotation element, and a first planet carrier being the third rotation element, and
wherein the second planetary gear set is a single pinion planetary gear set, and includes a second sun gear being the fourth rotation element, a second planet carrier being the fifth rotation element, and a second ring gear being the sixth rotation element.

4. The power transmission system of claim 1,
wherein the first planetary gear set is a single pinion planetary gear set, and includes a first sun gear being the first rotation element, a first planet carrier being the second rotation element, and a first ring gear being the third rotation element, and
wherein the second planetary gear set is a double pinion planetary gear set, and includes a second sun gear being the fourth rotation element, a second ring gear being the fifth rotation element, and a second planet carrier being the sixth rotation element.

5. The power transmission system of claim 1, wherein the transfer gears comprise:
a first transfer gear connecting the second rotation element to the output shaft; and
a second transfer gear connecting the fifth rotation element to the output shaft.

6. The power transmission system of claim 1, wherein the frictional elements comprise:
a first clutch selectively connecting two rotation elements among three rotation elements of the second planetary gear set;
a second clutch selectively connecting the first rotation element to the sixth rotation element; and
a first brake selectively connecting the sixth rotation element to the transmission housing.

7. The power transmission system of claim 6, wherein the first clutch is disposed between the fourth rotation element and the sixth rotation element.

8. The power transmission system of claim 6,
wherein the first brake is operated at a first electric vehicle mode,
wherein the first clutch is operated at a second electric vehicle mode,
wherein the first brake is operated at a first hybrid operating mode,
wherein the first clutch is operated at a second hybrid operating mode,
wherein the second clutch is operated at a third hybrid operating mode,
wherein the second clutch and the first brake are operated at a first engine mode, and
wherein the first clutch and the second clutch are operated at a second engine mode.

9. The power transmission system of claim 1, wherein the first motor/generator and the second motor/generator are disposed at a rear of the second planetary gear set.

10. The power transmission system of claim 1, wherein a third clutch is disposed between the engine and the input shaft.

11. A power transmission system of a hybrid electric vehicle comprising:
an input shaft receiving torque of an engine;
an output shaft disposed in parallel with the input shaft;
a first planetary gear set including:
  a first rotation element directly connected to a first motor/generator;
  a second rotation element connected to the output shaft; and
  a third rotation element directly connected to the input shaft;
a second planetary gear set including:
  a fourth rotation element directly connected to a second motor/generator;
  a fifth rotation element connected to the output shaft; and
  a sixth rotation element selectively connected to a transmission housing and selectively connected to the first rotation element;
a first transfer gear connecting the second rotation element to the output shaft;
a second transfer gear connecting the fifth rotation element to the output shaft; and
frictional elements selectively connecting two rotation elements among three rotation element of the second planetary gear set, selectively connecting the first rotation element to the sixth rotation element, or selectively connecting the sixth rotation element to the transmission housing.

12. The power transmission system of claim 11,
wherein the first planetary gear set is a single pinion planetary gear set, and includes a first sun gear being the first rotation element, a first planet carrier being the second rotation element, and a first ring gear being the third rotation element, and
wherein the second planetary gear set is a single pinion planetary gear set, and includes a second sun gear being the fourth rotation element, a second planet carrier being the fifth rotation element, and a second ring gear being the sixth rotation element.

13. The power transmission system of claim 11,
wherein the first planetary gear set is a double pinion planetary gear set, and includes a first sun gear being the first rotation element, a first ring gear being the second rotation element, and a first planet carrier being the third rotation element, and
wherein the second planetary gear set is a single pinion planetary gear set, and includes a second sun gear being the fourth rotation element, a second planet carrier being the fifth rotation element, and a second ring gear being the sixth rotation element.

14. The power transmission system of claim 11,
wherein the first planetary gear set is a single pinion planetary gear set, and includes a first sun gear being the first rotation element, a first planet carrier being the second rotation element, and a first ring gear being the third rotation element, and
wherein the second planetary gear set is a double pinion planetary gear set, and includes a second sun gear being the fourth rotation element, a second ring gear being the fifth rotation element, and a second planet carrier being the sixth rotation element.

15. The power transmission system of claim 11, wherein the frictional elements comprise:
a first clutch selectively connecting two rotation elements among three rotation elements of the second planetary gear set;
a second clutch selectively connecting the first rotation element to the sixth rotation element; and
a first brake selectively connecting the sixth rotation element to the transmission housing.

16. The power transmission system of claim 15,
wherein the first brake is operated at a first electric vehicle (EV) mode,
wherein the first clutch is operated at a second electric vehicle (EV) mode,
wherein the first brake is operated at a first hybrid operating mode,
wherein the first clutch is operated at a second hybrid operating mode,
wherein the second clutch is operated at a third hybrid operating mode,
wherein the second clutch and the first brake are operated at a first engine mode, and
wherein the first clutch and the second clutch are operated at a second engine mode.

17. The power transmission system of claim 15, wherein the first clutch is disposed between the fourth rotation element and the sixth rotation element.

18. The power transmission system of claim 11, wherein the first motor/generator and the second motor/generator are disposed at a rear of the second planetary gear set.

19. The power transmission system of claim 11, wherein a third clutch is disposed between the engine and the input shaft.

* * * * *